(12) United States Patent
Celik

(10) Patent No.: US 10,666,644 B2
(45) Date of Patent: May 26, 2020

(54) ENTERPRISE KEY AND PASSWORD MANAGEMENT SYSTEM

(71) Applicant: Mucteba Celik, Jersey City, NJ (US)

(72) Inventor: Mucteba Celik, Jersey City, NJ (US)

(73) Assignee: Revbits, LLC, Melville, NY (US)

( * ) Notice: Subject to any disclaimer, the term of this patent is extended or adjusted under 35 U.S.C. 154(b) by 239 days.

(21) Appl. No.: 15/792,959

(22) Filed: Oct. 25, 2017

(65) Prior Publication Data

US 2018/0227297 A1    Aug. 9, 2018

Related U.S. Application Data

(60) Provisional application No. 62/456,326, filed on Feb. 8, 2017.

(51) Int. Cl.
*H04L 9/00* (2006.01)
*H04L 29/06* (2006.01)
*H04L 9/32* (2006.01)

(52) U.S. Cl.
CPC ........ *H04L 63/0853* (2013.01); *H04L 9/3226* (2013.01); *H04L 9/3234* (2013.01); *H04L 63/20* (2013.01); *H04L 63/062* (2013.01); *H04L 63/083* (2013.01); *H04L 2209/805* (2013.01)

(58) Field of Classification Search
CPC ..... H04L 63/20; H04L 63/062; H04L 63/083; H04L 63/0853; H04L 9/3234; H04L 9/3226

See application file for complete search history.

(56) References Cited

U.S. PATENT DOCUMENTS

| | | | | |
|---|---|---|---|---|
| 7,536,722 B1 * | 5/2009 | Saltz | .................. | H04L 63/0815 726/20 |
| 9,491,161 B2 * | 11/2016 | Suresh | .................. | H04L 67/025 |
| 10,412,055 B2 * | 9/2019 | Thomson | .............. | H04L 63/166 |
| 2016/0094546 A1 * | 3/2016 | Innes | .................. | H04L 63/0823 713/156 |

* cited by examiner

*Primary Examiner* — Beemnet W Dada
(74) *Attorney, Agent, or Firm* — Mandelbaum Silfin Economou LLP

(57) ABSTRACT

A hardware, key-file and password assisted enterprise key and password management system. By leveraging hardware and key files, along with public-key cryptography, an extremely efficient and secure key, access and password management system is provided. After configuring an account, the user needs only one hardware key device and need only remember a single strong password.

9 Claims, 2 Drawing Sheets

ENTERPRISE KEY AND PASSWORD MANAGEMENT SYSTEM

CROSS-REFERENCE TO RELATED APPLICATION

This application claims the benefit of priority of U.S. provisional application No. 62/456,326, filed Feb. 8, 2017, the contents of which are herein incorporated by reference.

BACKGROUND OF THE INVENTION

The present invention relates to password management, and more particularly to enterprise password and key management for establishing a user's credentials.

Password and key management is a challenging task in today's enterprise computing environments. Users are regularly forced to change their passwords to improve security. However, a recent study shows that most users only change their old password by changing only 1 or 2 characters, thereby reducing the effectiveness of these security measures.

Users may operate in a variety of secure environments that each require the user to provide authentication credentials, such as a user name and a complex password. Memorizing more than two complex passwords is not easy, so users may only use a limited number of complex passwords across the different secure environments, which introduces an additional security risk.

From the enterprise perspective, managing a transient body of users and employees who join and leave certain companies and teams is a challenging task. Adding and revoking accesses and passwords needs to be automated and handled more efficiently.

Current systems do not leverage hardware, smart cards and RFID/NFC tags. These devices when configured properly are extremely secure. For instance smart cards are considered HSM (hardware security module) and breaking smart card security is not a trivial task.

As can be seen, there is a need for an improved software and encryption schema that combines hardware, key files and a single strong password that is memorized by user to harden and secure all accesses, keys and password belonging to the user.

SUMMARY OF THE INVENTION

In one aspect of the present invention, an enterprise credential management system for managing user credentials to access a network service is disclosed. The enterprise credential management system includes a first hardware security device carrying a first authentication credential for the user corresponding to the network service. A client computer is configured to generate a secured connection request to the network service according a specified connection parameter using the first authentication credential and a second authentication credential corresponding to the first authentication credential. A server is operatively coupled to the client computer via a secured network connection. The server is configured to receive, from the client computer, encrypted connection data corresponding to the secured connection request. A key management database is operatively coupled to the server and is configured to store the encrypted connection data in an encrypted connection container.

The hardware security device may include one or more of a smart card, a radio frequency identification (RFID); a near field communication (NFC) tag, and a key file. The one or more network services may include one or more of a remote desktop program (RDP) connection; a secure shell (SSH), a virtual network connection (VNC), Samba, a virtual private network (VPN), and a Website.

The encrypted container carries one or more connection parameters for the service connection; the first authentication credential; and the second authentication credential.

The secured network connection between the client computer and the server is established with an initial credential, established with a second hardware key storage device and a strong password. A symmetric encryption key may be derived from a key carried by the second hardware key storage device and the strong password selected by the user. An encryption module is configured to encrypt the connection data on the client computer utilizing the symmetric encryption key. A decryption module is configured to decrypt the contents of the encrypted container, when it is received on the client computer.

Other aspects of the invention include a method of for managing user credentials to access a network service. The method includes receiving a first authentication credential from a first hardware security operatively connected to a client computer; receiving a second authentication credential from a user input to the client computer; receiving a connection parameter to establish a secured network request to the network service; and encrypting, with a symmetric encryption key on the client computer, the first authentication credential, the second authentication credential, and the connection parameter as an encrypted connection data package.

The method also includes transmitting the encrypted connection data package to a server operatively connected to the client computer via a secure connection. The connection data package is then stored as a connection container in a database operatively connected to the server.

In other aspects of the invention, a selected connection container is retrieved from the server and decrypted on the client computer. The method may also include automatically connecting the client computer to the network service according to the decrypted first authentication credential, the second authentication credential, and the connection parameter.

The method preferably includes establishing a secure connection between the client computer and the server, wherein the secured network connection between the client computer and the server is established with an initial credential, having a key carried on a second hardware key storage device and a strong password selected by the user. The symmetric encryption key may be derived from the key carried by the second hardware key storage device and the strong password selected by the user.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, embodiments of the present invention provides a system and method for leveraging hardware security devices, such as Smart Cards, RFID cards/tags, NFC tags, with Key Files and Passwords to improve access security to computing systems. Embodiments of the invention also facilitate enterprise management of passwords and accesses to a network and web services such as RDP, SSH, VNC, Samba. Web applications credentials may be managed and secured by a central software application and system configuration.

According to aspects of the invention, a user's keys and passwords will rotate automatically and users may be added and removed from access lists managing access to enterprise services easily. Also users will not have to memorize and remember a number of complex passwords. Rather, they will only need to memorize and learn one very complex password.

Figure 1:
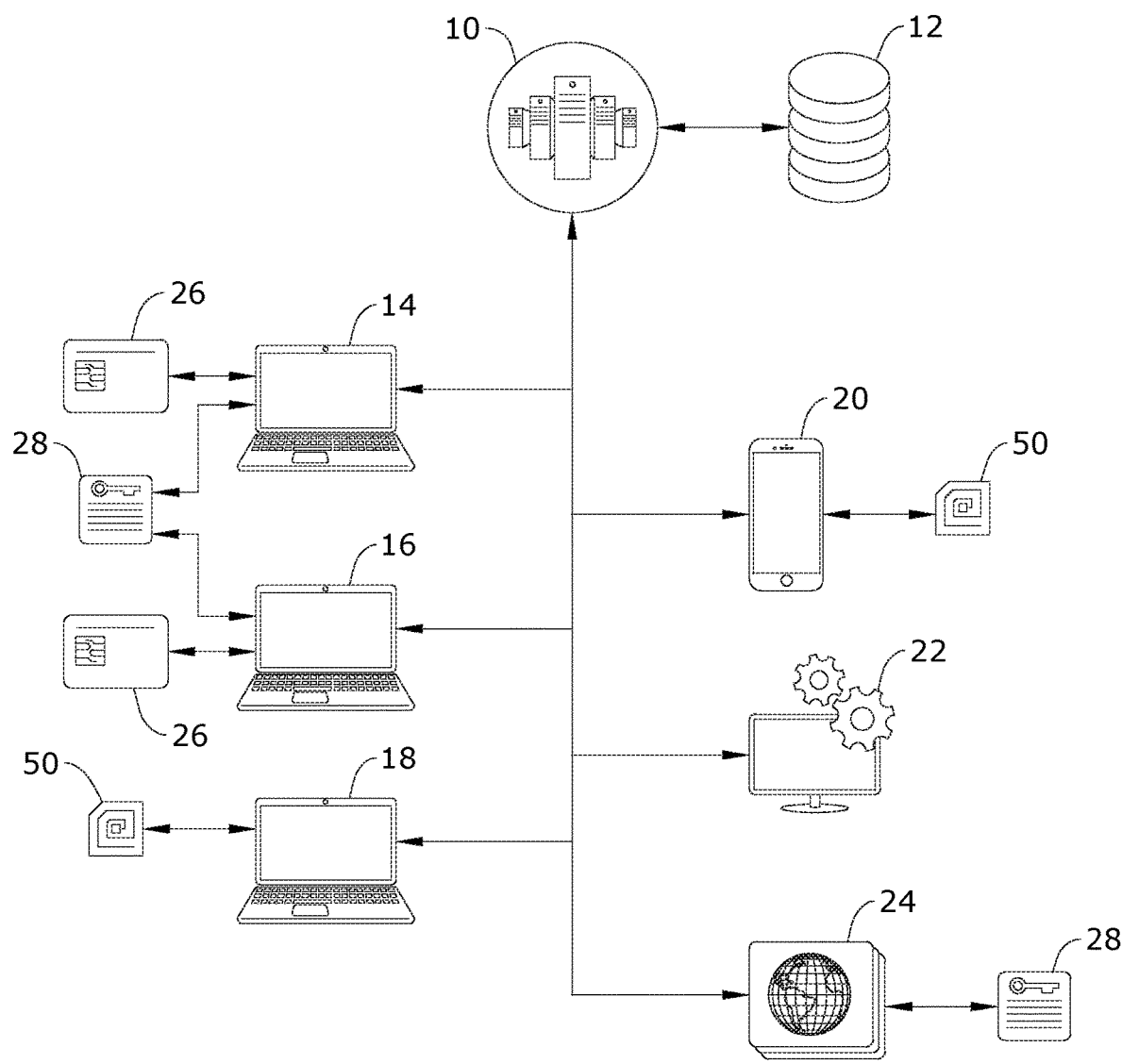
FIG. 1 is a system architecture diagram of an enterprise key and password management system.

As shown in reference to FIG. 1, illustrating a representative system architecture for implementing the present system, the present invention includes a centralized server 10, such as a cloud based server 10, that is configured to store and retrieve encrypted content. One or more client computing devices 14, 16, 18, 20 are configured to communicate with the server 10. The client devices may include a computing device 14, 16, 18, 20 configured with a display, a computer keyboard, a mouse, or other input interface for controlling the computing device. The client device may also include a website 24 accessed with a key file 28 for the user. A first hardware security device, such as, a smart card 26 or RFID/NFC tag 50, a key file 28 and associated readers, are also connected to the client device 14, 16, 18, 20, 24. The computing device 14, 16, 18, 20, 24 is configured for network communications with the server 10, which is in communication with a key storage database 12 to store connection parameters and manage keys 28 or an additional password for each of a plurality of users.

Figure 2:
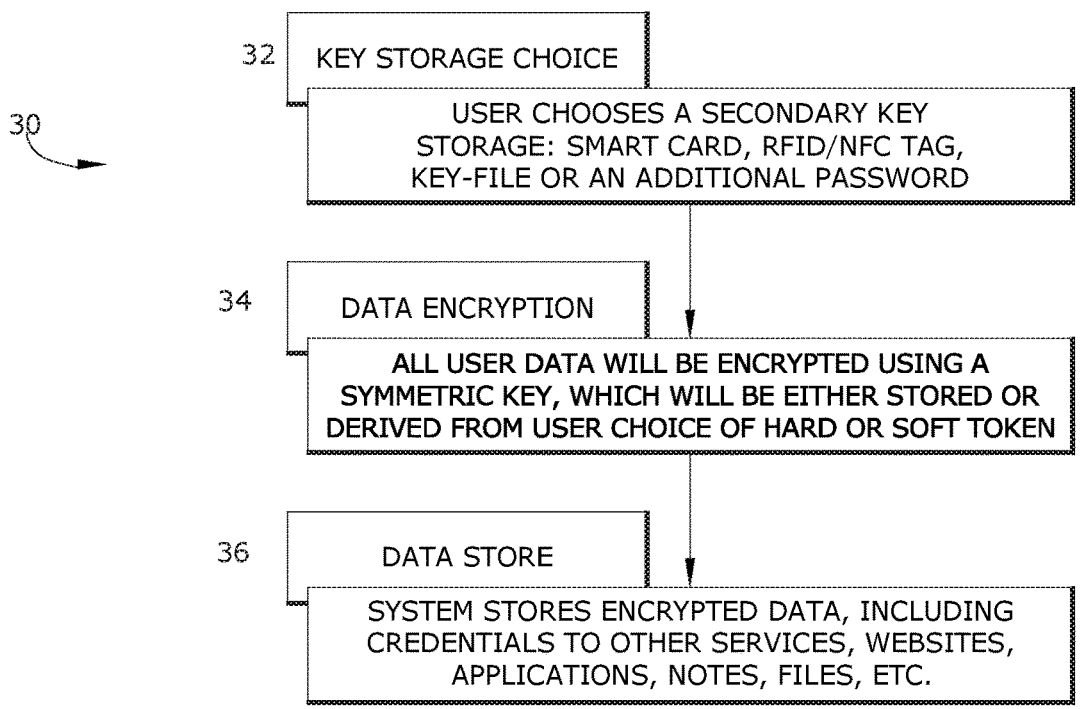
FIG. 2 is a flow chart for a key storage device and data encryption module.

As seen in reference to FIG. 2, a key storage device and data encryption module 30 is illustrated utilizing a client application 22 of the present invention, which may be one or more of a web hosted application, a desktop application, or a mobile application. At a key storage selection block 32, the user establishes an account utilizing a strong encryption password and selects a second key storage device as an initial credential. The selected second key storage device may be one or more of a smart card 26, an RFID card 50, an NFC tag 50, a key-file 28, or USB device or another additional password to establish a user's credentials and access permissions for a selected network service connection. The network service connection type can be one or more Remote Desktop Program (RDP) connections, a secure shell (SSH), a Virtual Network Connection (VNC), Samba, a Virtual Private Network (VPN), a Website or any other system that requires a user's credentials such as username, a password, a secret question, a secret token, a key file, or the like.

The user will then create one or more containers for one or more network service connections requiring the user's credentials and access permissions, as well as define the network service connection's connection type. At a data encryption block 34, the software 22 is configured with a symmetric encryption algorithm to generate a session key using the selected hardware security device 26, 28, 50. The user entry data is encrypted using the session key and at block 36 the encrypted credential data is sent to the server 10 where it is stored on the key storage database 12 in an encrypted form for later use.

Figure 3:
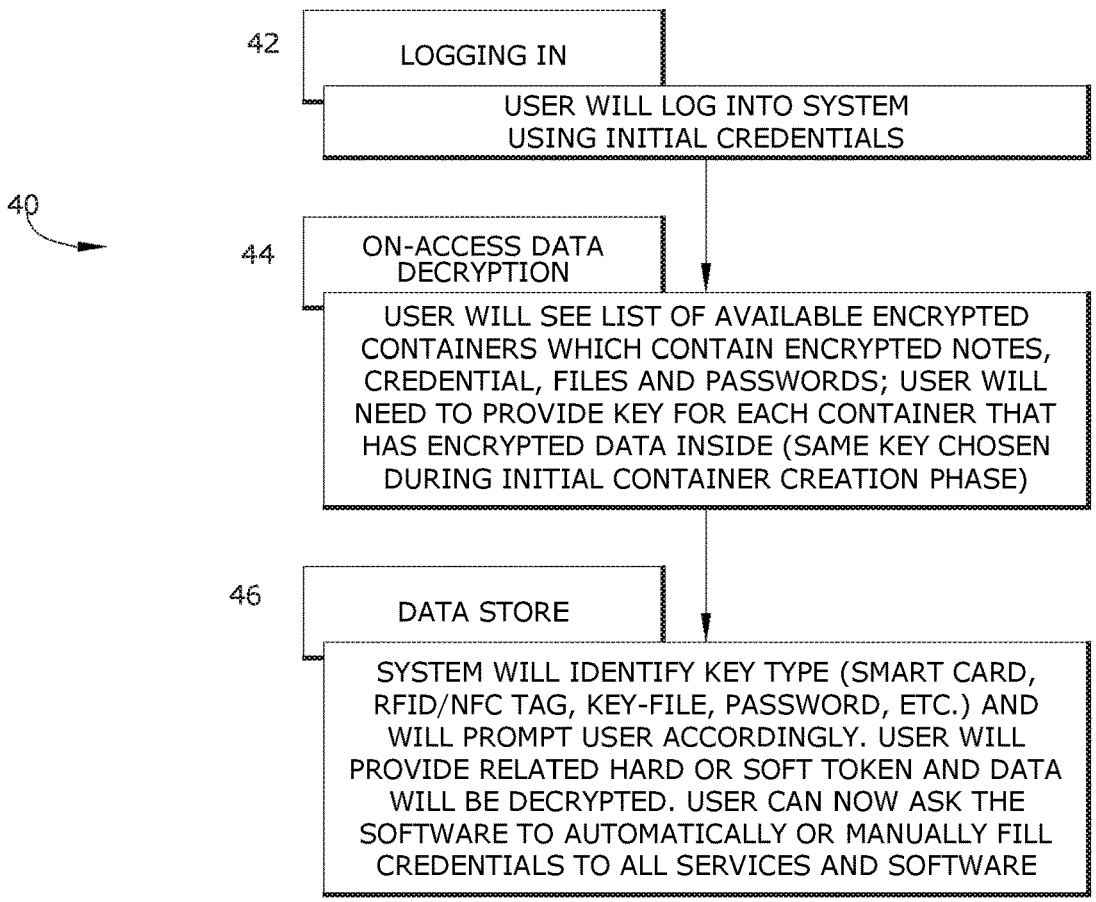
FIG. 3 is a flow chart for a data retrieval module.

As seen in reference to FIG. 3, a data retrieval module 40 is illustrated. After an authentication phase at block 42, utilizing the initial credential having a single strong password and an optional 2nd factor authentication scheme, the user interface will present a list of service container entries for keys and notes that are stored on the key storage device 12 in an encrypted form. The service container entries are all passwords, keys and accesses previously assigned by the user for the entry and completing the network service connection. The service entries are received and stored on the server 10 in an encrypted form and are decrypted on the client-side of the system.

A user interface may present the user with a listing of the available container entries that the user has previously configured for a secured environment. The user's stored credentials for that entry are retrieved and are used to access the service corresponding to the entry. As such, the user will only need to open the application of the present invention with a single strong password and hardware key in order to gain access to another network service connection for which they have defined an entry. Utilizing the stored credentials for the entry, the application software will log the user into the selected service automatically.

By way of non-limiting example if the entry is for a website username and password, the user will define the website URL, protocol, username and the password. When the user selects to store it in the system, the application will encrypt the entry data using the session key that depends on a main password of user and secondary hardware or software key provider (smart card, RFID/NFC tag, key file, USB device). The container entry data is then available on the server 10 for retrieval and use the next time the user needs to access a service or a website corresponding to the entry.

In another example, if the entry is for a Remote Desktop Program (RDP) or a Virtual Network Connection (VNC) key, the user defines the connection parameters and their credentials associated with the entry. The next time the user requires access to the RDP server, by selecting the corresponding container entry and choosing "Login", the connection parameters and credentials from the server 10 will be retrieved from the key database 12, decrypted on the client device, and will automatically log the client device into the service with the retrieved credentials over the defined protocol.

The application software receives everything in encrypted form from the server 10 and everything transferred from the client-side to the server 10 is encrypted before being transmitted over the network interface. The symmetric encryption key used to encrypt all the data is derived from user's password and a second factor (smart card or key file or NFC/RFID tag or a USB device) established during the user's initial login to the system. Combining these two together, the application software 22 produces the final symmetric encryption key and everything in the system will be encrypted and decrypted using this key.

Once the user has established their network service connections, the user need only manage their hardware (RFID, NFC, USB, Smartcard or key file). Depending on the service type, the system may be configured to rotate passwords on services and the user may define a password change frequency for an entry. Under the present system, the user will only need to choose and memorize one complex password and utilize a single 2nd encryption key storage device (smart card, RFID, NFC, USB or key file).

The system of the present invention may include at least one client device, being a computer with a user interface. The computer may include any computer including, but not limited to, a desktop, laptop, and smart device, such as, a tablet and smart phone. The computer includes a program product including a machine-readable program code for causing, when executed, the computer to perform steps. The program product may include software which may either be loaded onto the computer or accessed by the computer. The loaded software may include an application on a smart device. The software may be accessed by the computer using a web browser. The computer may access the software via the web browser using the internet, extranet, intranet, host server, internet cloud and the like.

The computer-based encryption data processing system and method described above is for purposes of example only, and may be implemented in any type of computer system or programming or processing environment, or in a computer program, alone or in conjunction with hardware. The present invention may also be implemented in software stored on a non-transitory computer-readable medium and executed as a computer program on a general purpose or special purpose computer. For clarity, only those aspects of the system germane to the invention are described, and product details well known in the art are omitted. For the same reason, the computer hardware is not described in further detail. It should thus be understood that the invention is not limited to any specific computer language, program, or computer.

It is further contemplated that the present invention may be run on a stand-alone computer system, or may be run from a server computer system that can be accessed by a plurality of client computer systems interconnected over an intranet network, or hosted by an Internet Service Provider (ISP) so that that it is accessible to clients over the Internet. In addition, many embodiments of the present invention have application to a wide range of industries. To the extent the present application discloses a system, the method implemented by that system, as well as software stored on a computer-readable medium and executed as a computer program to perform the method on a general purpose or special purpose computer, are within the scope of the present invention. Further, to the extent the present application discloses a method, a system of apparatuses configured to implement the method are within the scope of the present invention.

It should be understood, of course, that the foregoing relates to exemplary embodiments of the invention and that modifications may be made without departing from the spirit and scope of the invention as set forth in the following claims.

What is claimed is:

1. An enterprise credential management system for managing user credentials to access a network service, comprising:
   a client computer communicatively coupled to a first hardware security device carrying a first authentication credential for a user, the client computer configured to:
   (1) encrypt secure connection parameters for a network service based on the first authentication credential and a second authentication credential entered by a user, the secure connection parameters different from the first authentication credential and/or the second authentication credential,
   (2) to forward the encrypted secure connection parameters for storage via a secure network connected thereto,
   (3) to receive and decrypt the previously-stored encrypted secure connection parameters for the network service based on the first authentication credential and the second authentication credential, and
   (4) to generate a secured connection request to the network service according to the decrypted secure connection parameters; and
   a server coupled to the client computer via the secure network, the server configured to:
   (1) receive the encrypted secure connection parameters from the client computer via the secure network,
   (2) to store the received encrypted secure connection parameters in a key management database, and
   (3) to selectively transmit the previously-stored secure connection parameters to the client computer.

2. The enterprise credential management system of claim 1, wherein the hardware security device comprises one or more of a smart card, a radio frequency identification (RFID) card, a near field communication (NFC) tag, and a key file.

3. The enterprise credential management system of claim 1, wherein the network service comprises at least one of: a remote desktop program (RDP) connection, a secure shell (SSH), a virtual network connection (VNC), Samba, a virtual private network (VPN), and a website.

4. The enterprise credential management system of claim 1, wherein the encrypted secure connection parameters are stored at the key management database in an encrypted container.

5. The enterprise credential management system of claim 4, wherein the encrypted container is generated by the client computer based upon a symmetric encryption key derived from the first authentication credential and the second authentication credential.

6. The enterprise credential management system of claim 1, wherein the second authentication credential is a strong password selected by the user.

7. The enterprise credential management system of claim 5, wherein the client computer further comprises an encryption module configured to encrypt the secure connection parameters into the encrypted container on the client computer utilizing the symmetric encryption key.

8. The enterprise credential management system of claim 5, wherein the client computer further comprises a decryption module configured to decrypt the encrypted container upon receipt at the client computer.

9. The enterprise credential management system of claim 1, wherein the secure connection parameters include a website URL, protocol, username and password.

* * * * *